(12) United States Patent
Brown et al.

(10) Patent No.: US 7,089,365 B2
(45) Date of Patent: Aug. 8, 2006

(54) METHOD AND SYSTEM FOR AN ATOMICALLY UPDATED, CENTRAL CACHE MEMORY

(75) Inventors: David C. Brown, Redmond, WA (US); Mikhail V. Leonov, Kirkland, WA (US); Michael M. Byrd, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/184,578

(22) Filed: Jul. 19, 2005

(65) Prior Publication Data

US 2005/0251627 A1 Nov. 10, 2005

Related U.S. Application Data

(62) Division of application No. 10/352,599, filed on Jan. 28, 2003, now Pat. No. 7,020,746.

(51) Int. Cl.
*G06F 12/00* (2006.01)

(52) U.S. Cl. ............... 711/133; 711/118; 711/144; 711/154; 711/156; 711/159; 715/748

(58) Field of Classification Search ............... 711/133, 711/118, 144, 154, 156, 159; 715/748
See application file for complete search history.

(56) References Cited

U.S. PATENT DOCUMENTS

| | | | | |
|---|---|---|---|---|
| 5,185,878 A | * | 2/1993 | Baror et al. | 711/123 |
| 5,276,835 A | | 1/1994 | Mohan et al. | 711/144 |
| 5,287,473 A | | 2/1994 | Mohan et al. | 711/133 |
| 5,526,511 A | * | 6/1996 | Swenson et al. | 711/134 |
| 5,706,462 A | | 1/1998 | Matousek | 711/118 |
| 5,950,201 A | | 9/1999 | Van Huben et al. | 707/10 |
| 6,009,428 A | | 12/1999 | Kleewein et al. | 707/10 |
| 6,282,617 B1 | * | 8/2001 | Tirumala et al. | 711/133 |
| 6,523,091 B1 | * | 2/2003 | Tirumala et al. | 711/133 |
| 6,996,676 B1 | * | 2/2006 | Megiddo et al. | 711/129 |
| 2002/0010839 A1 | * | 1/2002 | Tirumala et al. | 711/133 |
| 2004/0098541 A1 | * | 5/2004 | Megiddo et al. | 711/129 |

OTHER PUBLICATIONS

An Introduction to Digital Typography Using TruType by George Moore, dated Apr. 2, 1992, http://msdn.microsoft.com/ARCHIVE, retrieved Sep. 11, 2005.
Chapter 8—Fonts, http://www.microsoft.com/technet, retrieved Sep. 11, 2005.

* cited by examiner

*Primary Examiner*—Stephen C. Elmore
(74) *Attorney, Agent, or Firm*—Merchant & Gould, LLC (57) ABSTRACT

Disclosed is a central cache that is updated without the overhead of locking. Updates are "atomic" in that they cannot be interrupted part way through. Applications are always free to read data in the cache, accessing the data through a reference table. Applications do not directly update the cache, instead, they send update requests to a service routine. To update the cache, the service routine proceeds in two phases. In the first phase, the service routine prepares the new data and adds them to the cache, without updating the reference table. During the first phase, an application accessing the cache cannot "see" the new data because the reference table has not yet been updated. After the first phase is complete, the service routine performs the second phase of the update process: atomically updating the reference table. The two-phase update process leaves the cache, at all times, in a consistent state.

5 Claims, 13 Drawing Sheets

FIG. 4a: Central Cache File Structure

FIG. 4b: Cache Data-Element Structure

METHOD AND SYSTEM FOR AN ATOMICALLY UPDATED, CENTRAL CACHE MEMORY

RELATED APPLICATIONS

This application is a Divisional of U.S. patent application Ser. No. 10/352,599, filed Jan. 28, 2003 now U.S. Pat. No. 7,020,746, which is incorporated by reference herein in its entirety.

TECHNICAL FIELD

The present invention is related generally to computer memory storage techniques, and, more particularly, to cache memories.

BACKGROUND OF THE INVENTION

Some data needed by computer applications are expensive to create or to access. The expenses can include computational resources to calculate the data and transportation costs (including bandwidth and time) to access the data over a network. Often, a computing device, after once expending resources to create or access these data, will store the data in a "cache" memory. Then, if the computing device again needs the data, they can be accessed inexpensively from the cache.

The cache can be local to the original application or to the original computing device, or it can be shared among several applications and devices. The latter type of cache is often called a "central" cache. In some environments, each application supports a local cache for its own use while sharing a central cache with other applications. The central cache is optimized for storing data useful to more than one application, while the local caches are available to provide the benefits of caching for those data specific to each application.

Managing data in a central cache is rarely straightforward. Multiple applications attempting to read data from the central cache rarely cause difficulties, but the same cannot be said when at least one application wishes to add data to the cache. If other applications are allowed to read from the central cache at the same time that one application is writing to the cache, then the readers can get out-of-date, or even garbled, data. This access coordination problem is exacerbated when more than one application wishes to add data to the cache.

A common approach to ameliorating this access coordination problem is called "cache locking." Whenever one application wishes to change the contents of the cache, by adding, deleting, or modifying its contents, it seeks sole access to a "lock" data structure. While it has the lock, the writer application can modify the cache, and other applications are prevented from accessing the cache as long as a writer has the lock. Thus, readers are prevented from getting out-of-date or garbled data. If two applications both wish to modify the cache, then one of them must wait until the other relinquishes the lock.

Locks can be quite useful in coordinating access to a central cache. However, it is apparent that they delay access for all applications whenever one application wishes to modify the cache. For some central caches, applications readily tolerate this slowdown. For other caches, however, it can be a real nuisance. For example, consider a font-glyph cache. Characters displayed on a computer screen are made up of individual elements called "glyphs." As some of these glyphs contain a significant amount of data, and as some of the glyphs consume significant computational resources in their generation, they are ideal subjects for a central cache. However, locking the font-glyph cache while a new glyph is added to it can cause a noticeable delay in an application writing to the computer's screen.

When the memory resources available to a central cache are limited, another cache management issue arises. Multiple applications wishing to add data to the cache operate independently of one another. Thus, none of these applications has a "global" view as to which data should be added to the central cache in order to improve the operating environment generally. The same issue arises when the central cache grows too large and is reformulated in a smaller size in order to allow for further additions. No one application can decide which data should be retained in the central cache and which data are best removed in order to free up memory for future cache growth.

SUMMARY OF THE INVENTION

In view of the foregoing, the present invention provides a central cache that can be updated without the delay overhead of locking and that has a global view of the importance of the data within the cache. "Atomic" updates provide the benefits of access coordination without incurring the delay overhead of locks. Cache updates are "atomic" in that they are so designed that they cannot be interrupted part way through. They result in a cache that is always up-to-date and consistent when accessed by an application.

Applications are always free to read data in the central cache, accessing the data through a reference table. However, the applications do not directly update the cache, instead, they send update requests to a service routine. To update the cache, the cache service routine proceeds in two phases. In the first phase, the cache service routine prepares the new data and adds them to the cache, without updating the reference table. This first phase may take some time, but the cache remains fully accessible to applications as the cache is not locked. During the first phase, an application accessing the cache cannot "see" the new data because the reference table has not yet been updated. Only after the cache data are fully prepared and loaded into the cache does the cache service routine perform the second phase of the update process: updating the reference table. This update, consisting of changing only one pointer, is performed atomically without locking the cache. Thus, the two-phase update process does not require that the cache ever be locked and leaves the cache, at all times, in a valid state for accessing applications. Because all updates are performed by one cache service routine, there is no need for locks to coordinate among multiple cache writers.

The cache service routine collects statistics on how data in the cache are used. When the cache grows too large, the cache service routine uses these statistics to decide which data should be copied into a new cache. The new cache is created atomically, again in two phases. During the first phase, the cache service routine creates the new cache and populates it with selected data from the old cache. Applications have, as yet, no knowledge of the new cache. When the new cache is ready for use, the cache service routine adds a reference to it in a header of the old cache. Then, in the second phase and using another atomic operation, the cache service routine marks the old cache "obsolete." On noticing that the old cache is marked obsolete, an application follows the reference to the new cache and starts to use only the new cache. As in updates within a cache, this mechanism for replacing the entire cache is performed in such a manner that applications always see a consistent cache.

Applications can continue to use an obsolete cache until they notice the obsolete flag and switch over to the new cache. Once all applications have switched, the obsolete cache is automatically deleted.

In some embodiments, the reference table within a cache consists of offsets that specify the location of data stored in the cache relative to another location within the cache. This has the advantage that the cache may be stored as a file and immediately re-used after the computing device hosting the cache reboots.

The central cache can be hosted by one computing device and used by applications on that and on other computing devices. Each application can also have its own local cache to use in conjunction with the central cache. If the local cache has the same data structure as the central cache, then the same cache-access code can be used for both caches.

The cache service routine applies a heuristic to the statistics on cache usage that it gathers in order to decide which data to keep when replacing the cache. In some embodiments, a user interface is provided to allow the heuristic to be changed and to allow operation of the cache to be monitored.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1b is a block diagram showing a central cache memory shared among the computing devices of FIG. 1a;

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 1A:
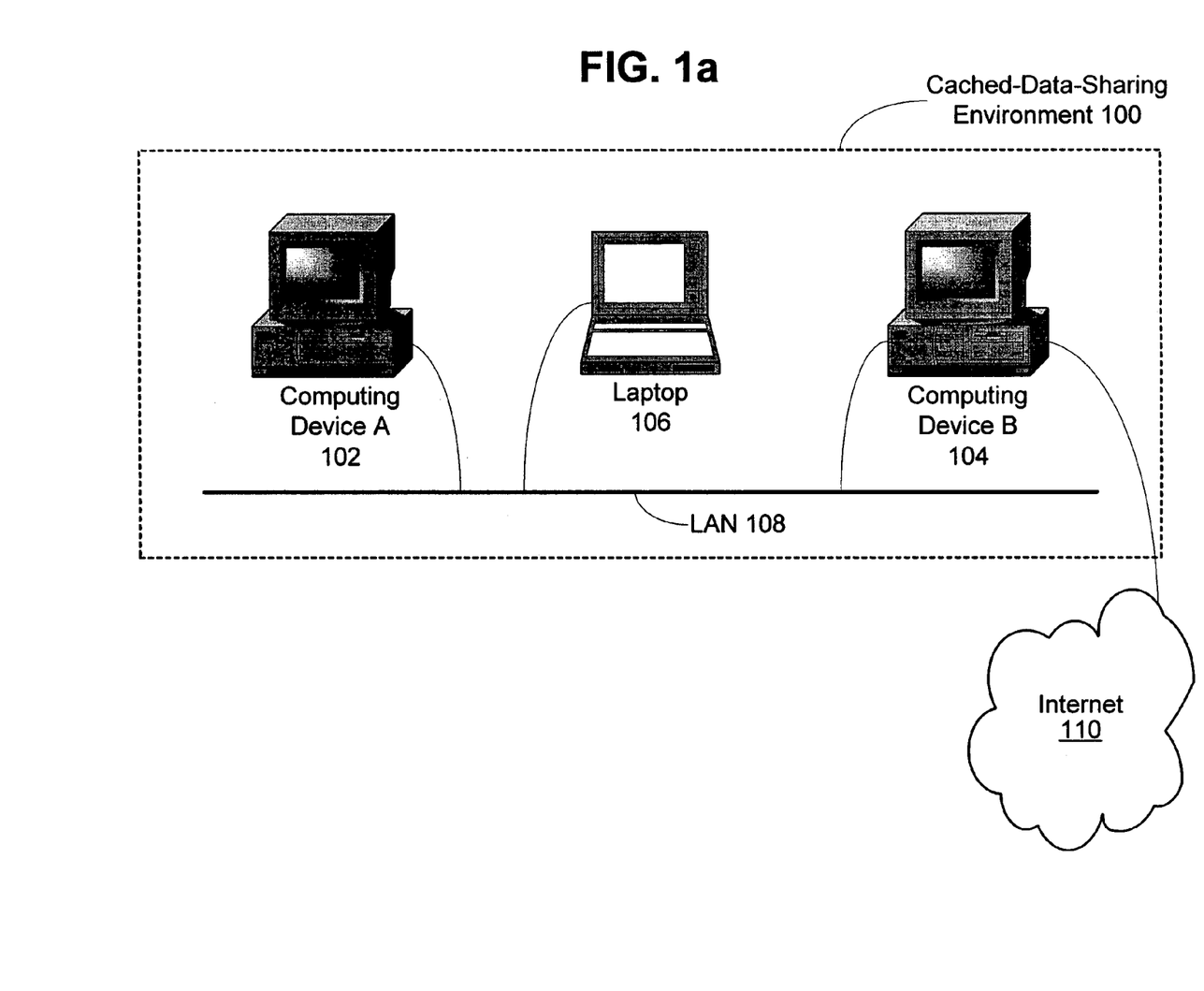
FIG. 1a is a block diagram showing three computing devices sharing cache data via a local area network (LAN)

The present invention provides an atomically updated, central cache memory. The central cache can be used exclusively by applications running on the computing device that hosts the cache, or, as in FIG. 1a, the central cache can be used by applications on several computing devices. In FIG. 1a, three computing devices, A 102, B 104, and a laptop 106, are in a cached-data-sharing environment 100. A central cache (not shown) resides on computing device A 102 and is accessible to applications via a LAN 108. Standard communications protocols exist for transporting cache requests and responses among the computing devices in the shared environment 100.

A connection to the Internet 110 is shown indicating that even remote computing devices can join the cached-data-sharing environment 100. In reality, the increased communications time needed for such a remote device to access the central cache runs counter to the cache's purpose of providing fast access to data. Most central cache scenarios will involve only one, or at most a few closely located, computing devices.

Figure 1B:
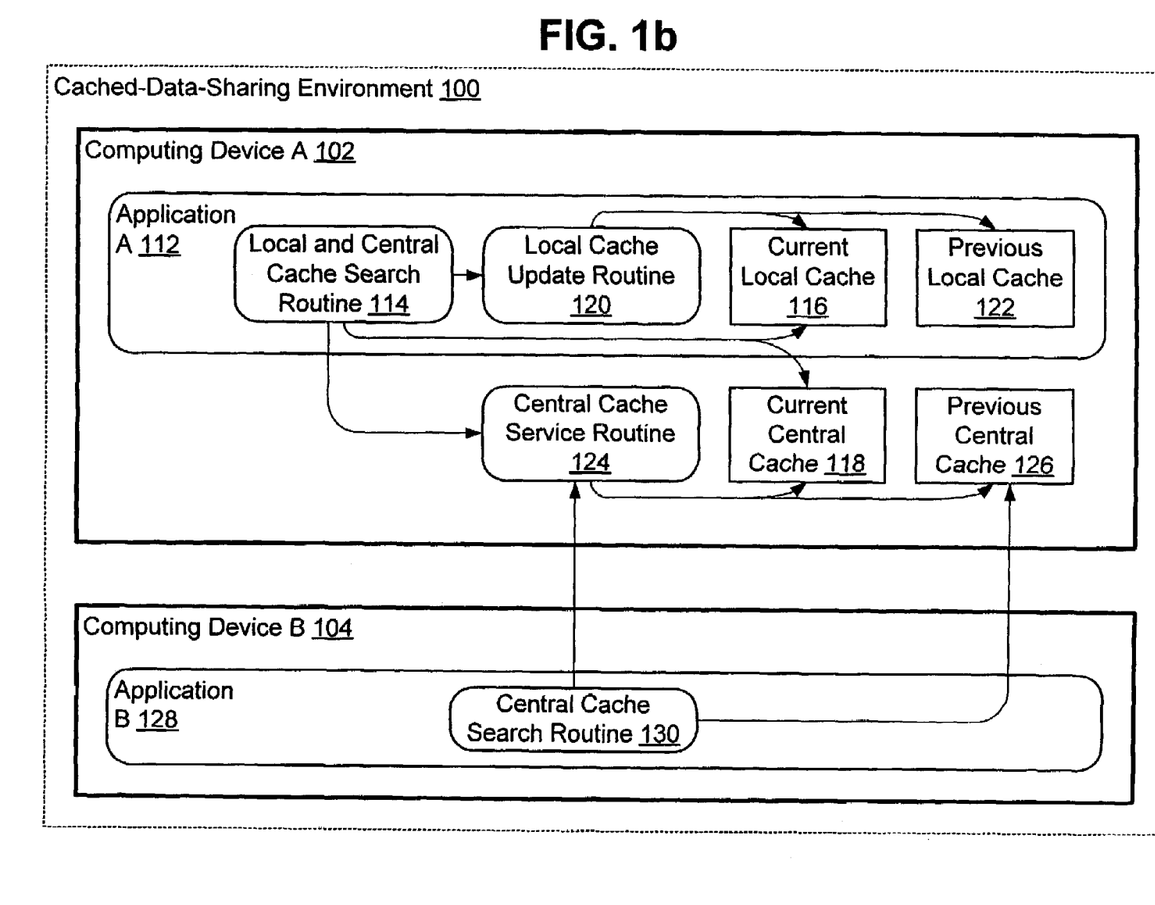

FIG. 1b presents structural details of an exemplary embodiment of the cached-data-sharing environment 100 of FIG. 1a. Application A 112 is running on computing device A 102. Among the routines that together make up application A 112 is a local and central cache search routine 114. When application A 112 needs data that could reside in a cache, this routine 114 looks for the data in the current local cache 116 and in the current central cache 118. The local cache 116 is part of, and under the control of, the application A 112. The central cache 118 is not a part of application A 112, but is accessible to it and to other applications.

If the central cache search routine 114 finds the requested data in either the local cache 116 or in the central cache 118, it returns the data to application A 112. If not, the data are sought elsewhere or are created. Once the data are found or created, the cache search routine 114 requests that the data be added to the local cache 116 by calling a local cache update routine 120. A request is also sent to the central cache service routine 124 to add the data to the central cache 118.

Both local and central caches grow when data are added to them. When they become too big, a new cache is created and is populated with some of the data of the previous cache. To select which data are carried over to the new cache, any number of methods are applied. For example, the most recently used data are selected, or the most often used data. FIG. 1b shows a previous local cache 122 along with the current local cache 116.

When creating a new central cache, care is taken to prevent the disruption of applications using the central cache. When the new central cache 118 is ready, the older central cache 126 is marked "obsolete" to warn applications that a newer cache is available. However, those applications need not immediately switch to the newer cache 118, but can choose to continue accessing the older central cache 126 for a while. Once no more applications access the older central cache 126, that cache is deleted.

Application B 128 runs on another computing device in the cached-data-sharing environment 100. This application is shown without a local cache, but it does have a central cache search routine 130. That routine still accesses the older central cache 126, having not yet noticed that this cache is marked obsolete. The cache search routine 130 can request that data be added to the central cache, but the central cache service routine 124 will add that data to the current central cache 118, rather than to the obsolete cache 126.

Figure 2:
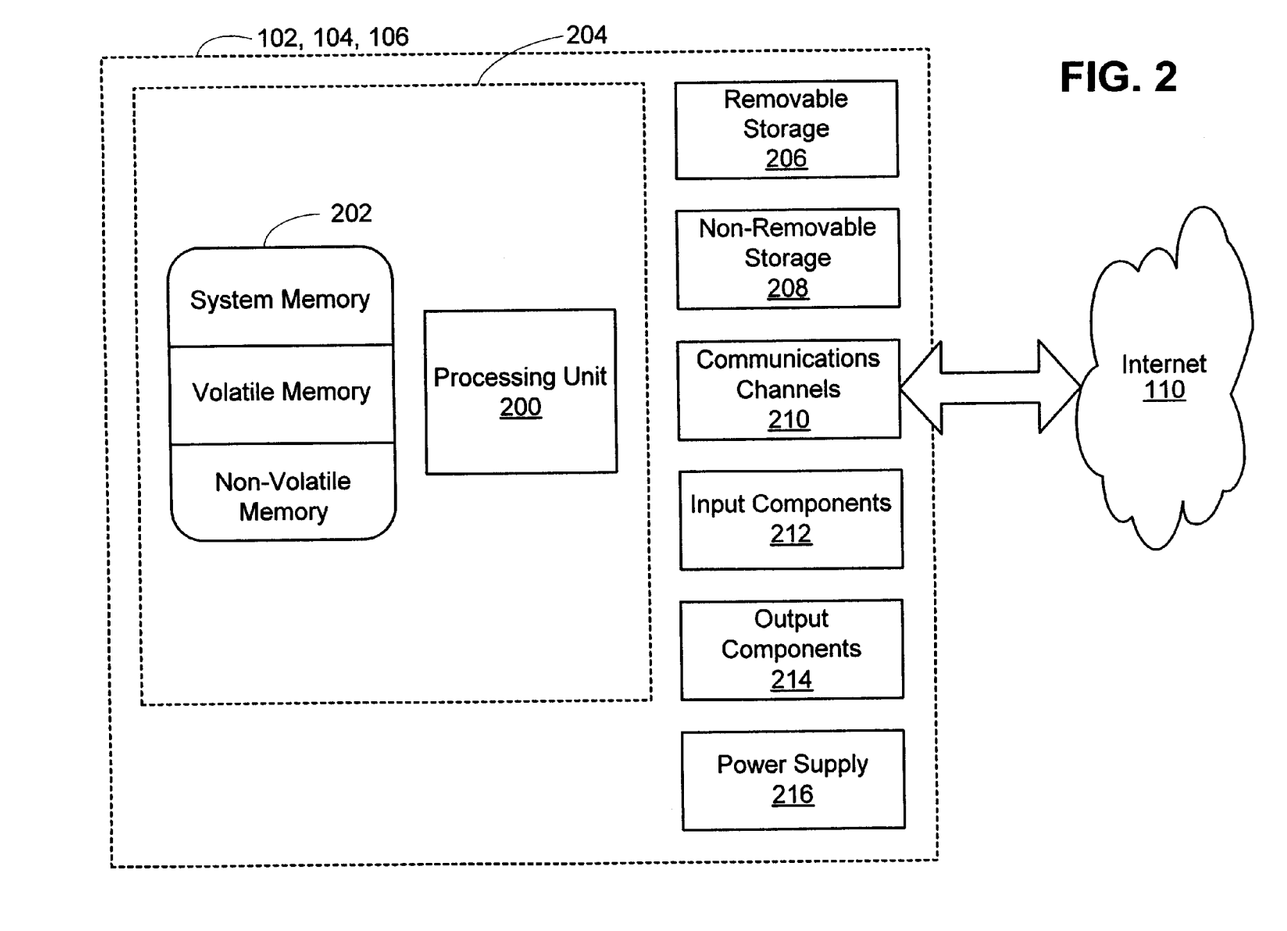
FIG. 2 is a schematic diagram generally illustrating an exemplary computer system that supports the present invention.

The computing devices 102, 104, and 106 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 102 may have additional features and functionality. For example, the computing device 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 102. Any such computer-storage media may be part of device 102. Device 102 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 212 such as a keyboard, mouse, pen, voice-input device, tablet, touch-input device, etc. Output devices 214 such as a display (which may be integrated with a touch-input device), speakers, and printer may also be included. All these devices are well known in the art and need not be discussed at length here.

FIGS. 3*a* through 3*d* present an exemplary method for the local and central cache search routine 114 of FIG. 1*b*. This flowchart includes many options that need not be included in every embodiment of the cache search routine 114.

Figure 3A:
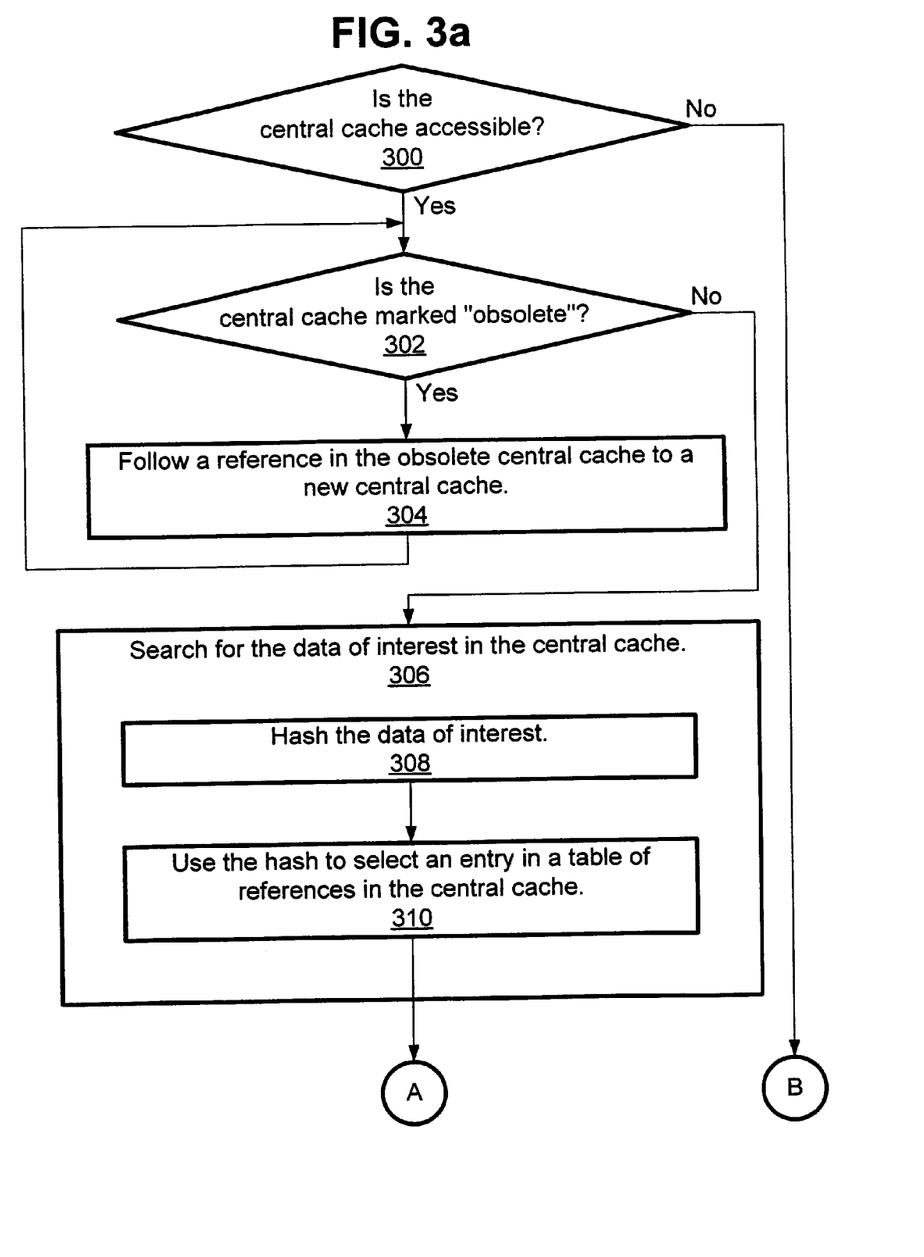
FIGS. 3a through 3d together form a flowchart illustrating an exemplary method for an application program to attempt to access data from a central cache according to the present invention.

Before the flowchart begins at step 300 of FIG. 3*a*, a request is made to the cache search routine 114 to access data of interest to the application A 112. In step 300, the cache search routine 114 begins by checking if a central cache is accessible. If no central cache is accessible, then the cache search routine 114 goes to step 326 of FIG. 3*d* and looks for the data of interest in a local cache. Depending upon the circumstances, other embodiments of the cache search routine 114 attempt to access a local cache before the central cache.

If a central cache is accessible, then the cache search routine 114 checks, in step 302, to see if the central cache is marked "obsolete." Note that this step, and the following step 304, are optional: The cache search routine 114 can continue to use an obsolete cache. However, in order to remain current, the cache search routine 114 should periodically check the status of the central cache that it is accessing and release the old cache once it notices that the old cache is obsolete.

Figure 5A:
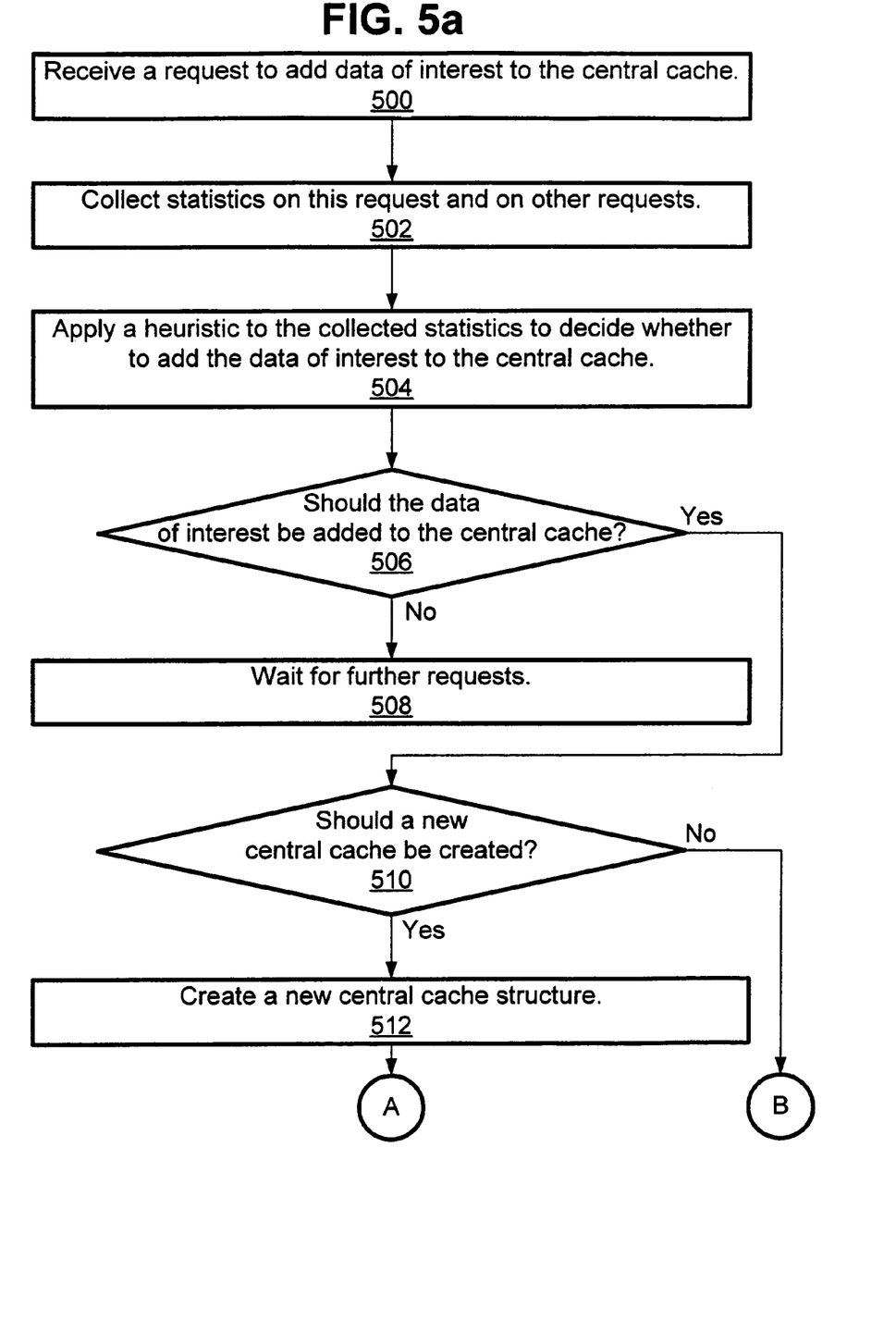
FIGS. 5a through 5d together form a flowchart of an exemplary method for a routine that maintains a central cache according to the present invention.
Figure 5B:
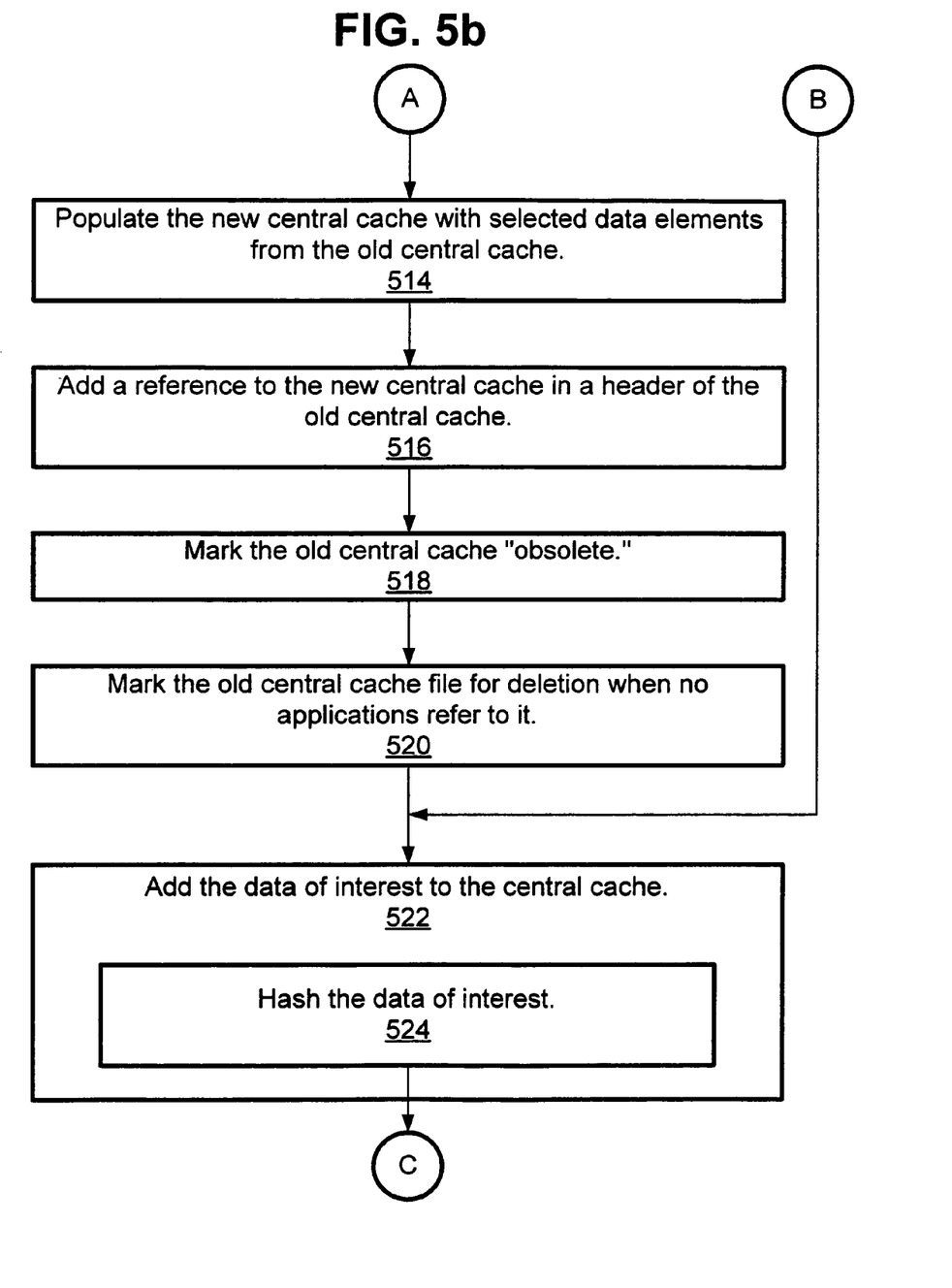

Before a central cache is marked obsolete, the central cache service routine 124 creates a new central cache (see steps 512 through 518 of FIGS. 5*a* and 5*b*). Thus, in step 304 the cache search routine 114 can follow a reference in a header of the obsolete central cache to the current central cache. Because the delay between when a request arrives and when that request is processed can be significant, more than one cache can be marked obsolete during the delay. In that case, steps 302 and 304 are repeated until a non-obsolete cache is reached.

Figure 3B:
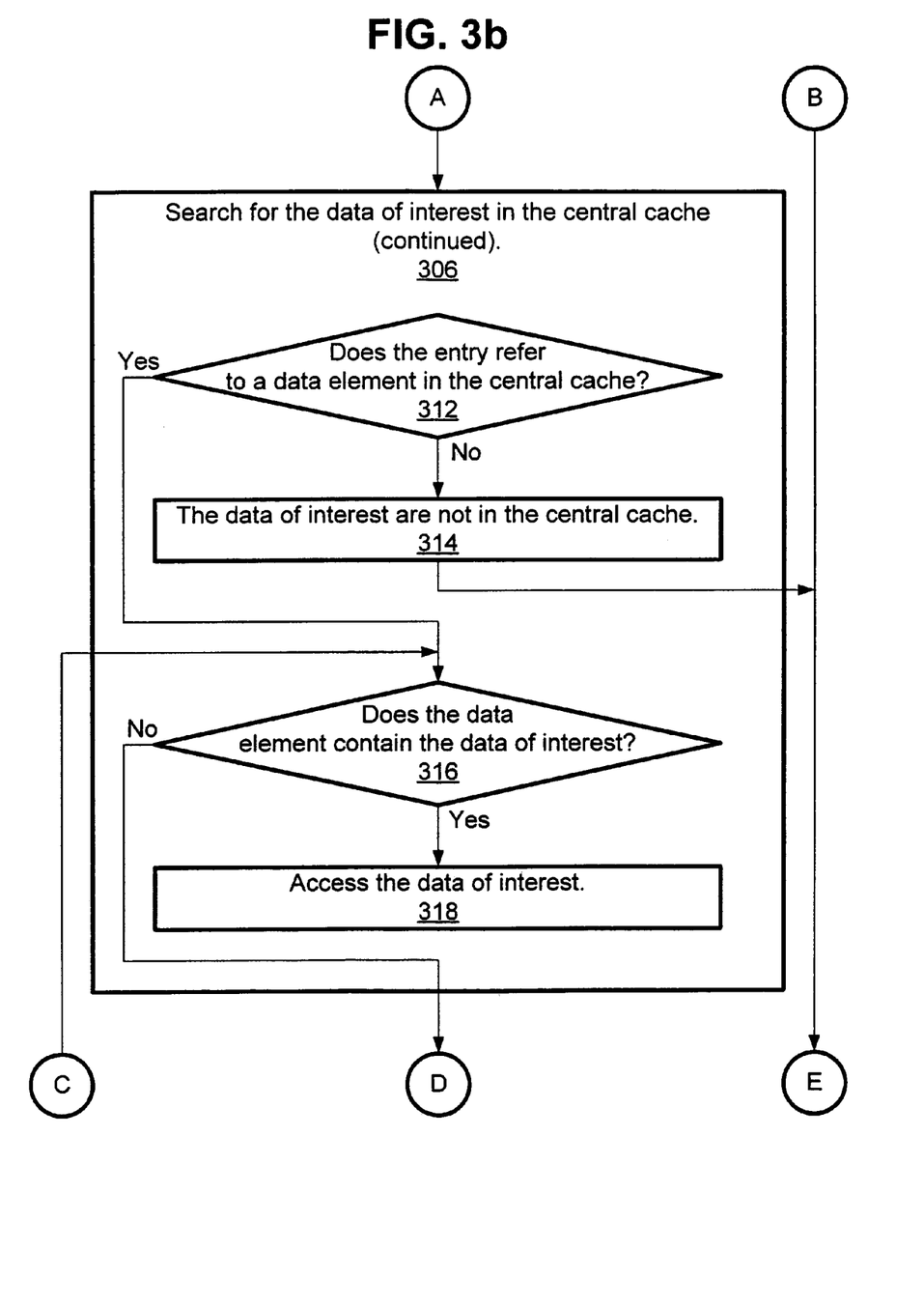
Figure 3C:
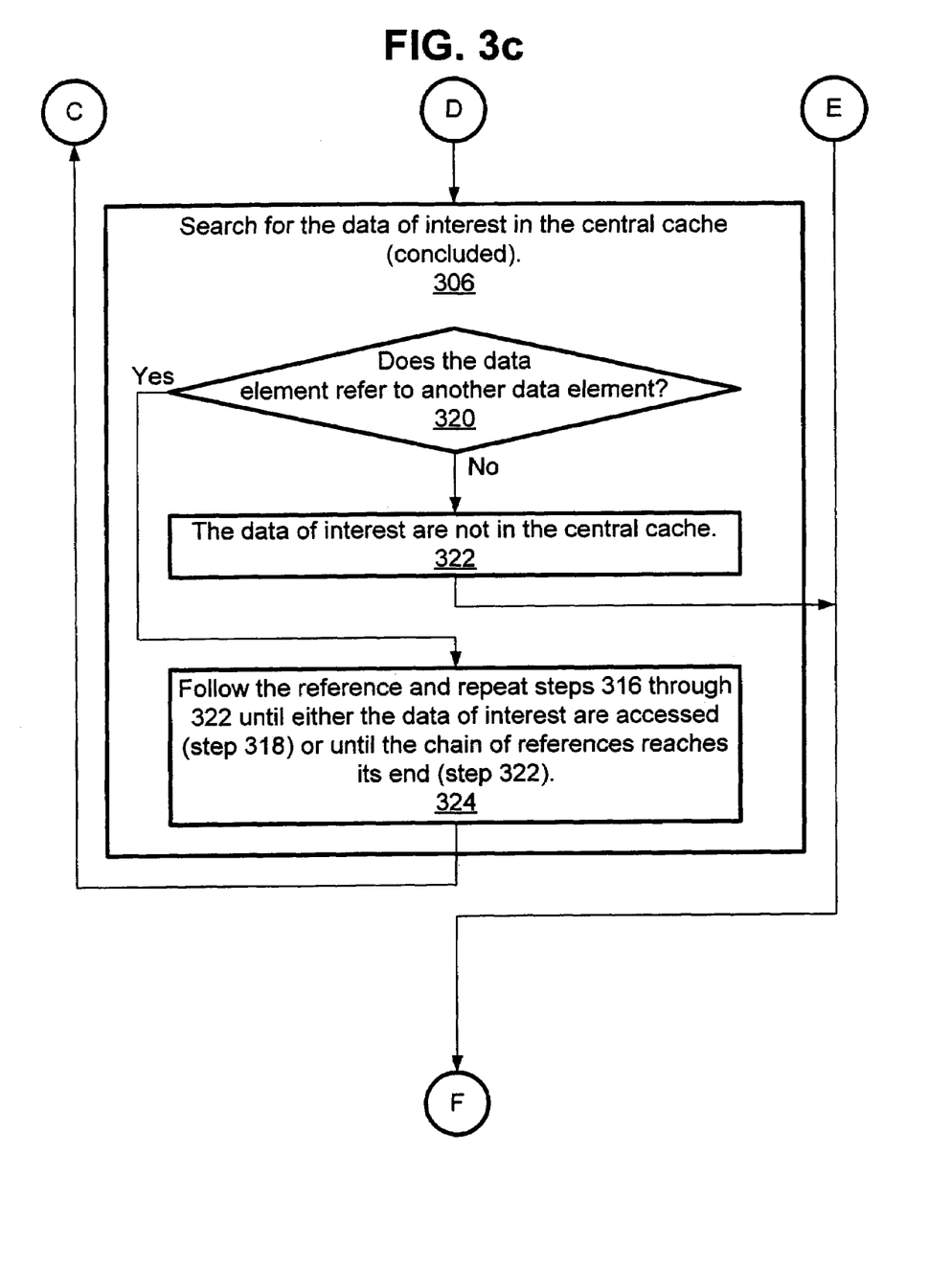

In step 306, the cache search routine 114 accesses the central cache to see if it contains the data of interest. The specifics of step 306 can vary widely depending upon the specifics of the structure of the central cache. Step 306 as shown in FIGS. 3*a* through 3*c* presents one possible implementation and is meant to be viewed in conjunction with the exemplary cache data structures shown in FIGS. 4*a* and 4*b*.

Figure 4A:
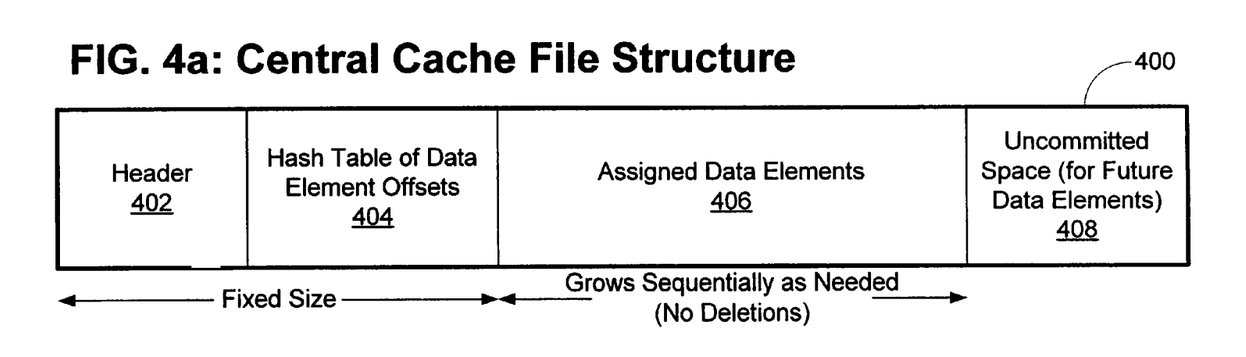
FIG. 4a is a schematic diagram showing an exemplary data structure for a central cache according to the present invention.

FIG. 4*a* illustrates a structure of a central cache 400 that is usable in conjunction with the procedure illustrated in step 306. A fixed size header 402 contains the obsolete flag and, if the flag is set, a reference to a more current central cache 400. Next is a fixed size table of references 404. Each entry in the table of references 404 is either a reference to a data element (see 410 of FIG. 4*b*) in the data element storage area 406 or a special value (e.g., NULL) indicating that the entry does not refer to a data element. In some embodiments, these references are given as integer offsets. This allows the central cache 400 to be stored as a file on disk and restored after the host computing device 102 reboots.

The actual cache data are stored as individual data elements 410. The space allocated to these data elements 406 grows as needed into an area of uncommitted space 408. When the uncommitted space 408 is used up, it is time for the cache service routine 124 to create a new central cache 400.

The particular implementation illustrated in step 306 begins in step 308 by hashing the data of interest. The hash is then used, in step 310, as an index into the table of references 404 in the central cache 400. The selected entry in the table of references 404 is examined in step 312 of FIG. 3b. If that entry does not refer to any data element, then the data of interest are not in the central cache 400 (step 314). The cache search routine 114 then proceeds to step 326 of FIG. 3d to look for the data of interest elsewhere than in the central cache 400.

If, on the other hand, the selected entry in the table of references 404 does refer to a data element, then that data element may or may not contain the data of interest. The reason for this is that different data values may hash to the same value and lead to selection of the same entry in the table of references 404.

Figure 4B:
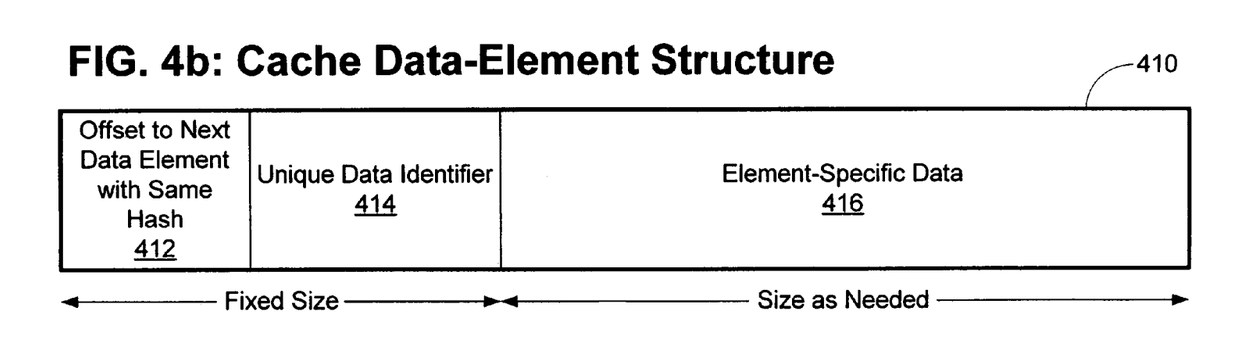
FIG. 4b is a schematic diagram showing an exemplary data structure for a data element in a central cache.

Refer to the exemplary data element structure 410 of FIG. 4b. Each data element 410 begins with a reference 412 that either refers to another data element 410 with the same hash value or a special value (e.g., NULL) indicating that the entry does not refer to another data element 410. Just as with the entries in the table of references 404, this reference can be given as an integer offset. Following the reference 412 is a data identifier field 414 that uniquely identifies the data contained in this data element 410. Finally is a field 416 that contains the data themselves. The size and structure of this field 416 are specific to the nature of the stored data. In some embodiments, the data element 410 contains a field indicating its size or, equivalently, the location of the end of the element-specific data field 416. In other embodiments, a field in the header 402 of the central cache 400 indicates the end of the assigned data storage area 406. In any case, these length fields are used to indicate where another data element 410 can be added to the cache 400 (in step 534 of FIG. 5d, discussed below).

With this exemplary structure of the data element 410 in mind, return to step 316 of FIG. 3b. The hash of the data element 410 in step 316 matches the hash of the data of interest. To see whether this data element 410 contains the data of interest, the data identifier field 414 of the data element 410 is compared against the data of interest. If they match, then the search is complete. The data of interest are retrieved in step 318 and passed to the application A 112. This successfully ends the cache search routine 114 of FIGS. 3a through 3d.

If, on the other hand, the comparison in step 316 reveals that this data element 410 does not contain the data of interest, then the cache search routine 114 proceeds to step 320 of FIG. 3c. In step 320, the reference field 412 of the data element 410 is examined. If this field does not refer to another data element 410, then the central cache 400 does not contain the data of interest (step 322). The cache search routine 114 proceeds to step 326 of FIG. 3d to search elsewhere for the data of interest.

In step 320, if the reference field 412 of the data element 410 refers to a further data element, then that further data element is examined to see if it contains the data of interest. Step 324 captures this process: The chain of data elements 410 is followed by repeating steps 316 through 322 until either the data of interest are found and retrieved (step 318) or until the end of the chain is reached without finding the data of interest (step 322).

Figure 3D:
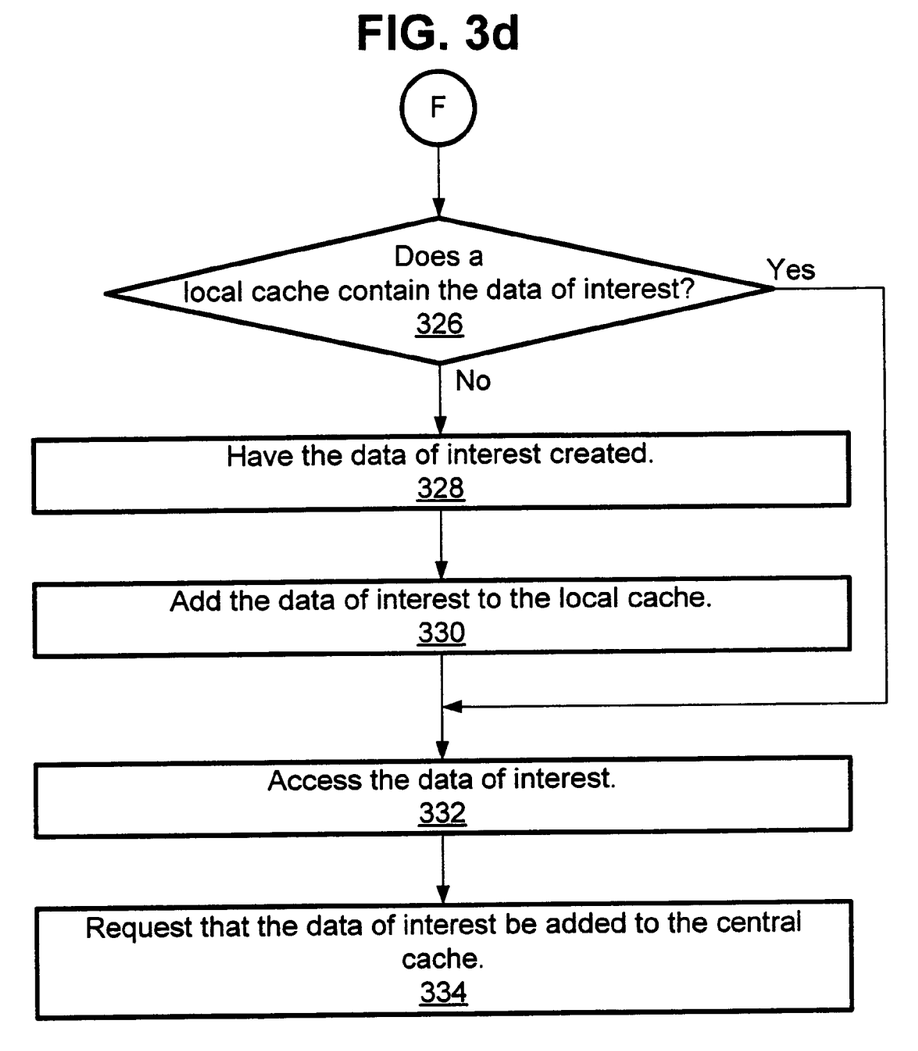

If the central cache 400 does not contain the data of interest, then the cache search routine 114, in step 326 of FIG. 3d, can search a cache 116 local to the application A 112. In some implementations, the details of step 326 mirror those of step 306. This allows the cache search code to be re-used. In any case, if the local cache 116 contains the data of interest, then those data are retrieved in step 332. If not, and assuming that there are no other caches to search for the data of interest, then those data are created in step 328. Those data can then be added to the local cache 116 in step 330 to facilitate future access. A request to add the created data to the central cache 400 can be made in step 334.

FIGS. 3a through 3d illustrate how the cache search routine 114 retrieves data of interest, either from a central cache 400 or from elsewhere. FIGS. 5a through 5d illustrate another aspect of the cache 400: the cache service routine 124 that adds data to the cache 400 and creates a new central cache when the present one becomes full. Because the cache service routine 124 is the only routine that adds data to the cache 400, there is no need to lock the cache 400 in order to prevent collisions among multiple writers. Also because all write requests flow through it, the cache service routine 124 can collect statistics about cache usage and form a "global" view of the importance of particular requests to add data to the cache 400 and can decide which data should be carried over when a new cache is created. The procedure of FIGS. 5a through 5d is exemplary only. It uses the central cache data structures introduced in FIGS. 4a and 4b.

The cache service routine 124 begins in step 500 of FIG. 5a when it receives a request to add data to the central cache 400. This request may have originated when a cache search routine 114 performed step 334 of FIG. 3d.

In step 502, some embodiments of the cache service routine 124 collect statistics on the received request and on other requests. In step 504, the cache service routine 124 decides whether to comply with this request. Some embodiments simply comply with all requests, while others consult collected statistics before deciding if the data of interest are "worthy" of being added to the central cache 400. Some embodiments deny the request if the size of the data of interest is too great compared with the uncommitted space 408 in the cache 400. The data of interest are compared against data in the cache 400 (possibly by performing step 306 of FIGS. 3a through 3c), and the request is denied if the data of interest are already present. This can happen because requests received in step 500 are queued, and there can be a significant delay between when a request arrives and when the data of interest are added to the cache 400 (in step 522 of FIGS. 5b through 5d). During the delay, the requesting cache service routine 114, or another, can re-access the cache 400, fail to find the data of interest, and re-submit the request. By the time the later request is processed, the data of interest have already been added, pursuant to the earlier request, to the queue 400. In any case, if a decision is reached in step 506 not to comply with the request, then the cache service routine 124 waits for further requests in step 508.

If a decision is made to comply with the request, then in step 510 the cache service routine 124 decides whether a new central cache 400 is needed. For example, if the data of interest will not fit into the uncommitted space 408 in the cache 400, then a new cache 400 is created in steps 512 through 520 of FIGS. 5a and 5b. A new cache 400 can also be created if the table of references 404 is becoming full or if the cache 400 has too many data elements 410 that have not been used for a while. If a new cache 400 is not needed, then the cache service routine 124 proceeds directly to adding the data of interest in step 522 of FIG. 5b.

If a new central cache 400 is needed, an empty shell is created in step 512. Caches are generally stored in RAM so that they can provide fast access to their data. Some operating systems allow an area of RAM to be mapped by the file system. This provides certain advantages to be described later.

In step 514 of FIG. 5b, the cache service routine 124 populates the newly created cache 400 with data elements 410 selected from the existing cache. There are several possible ways in which the data elements 410 can be selected. The cache service routine 124 can collect statistics on how the data elements 410 have been used. Then, the most recently used elements, or the most often used, are selected. Some embodiments use an element of randomness in the selection. In any case, once the data elements 410 are selected, they are copied over into the data storage area 406 of the new central cache 400, and the table of references 404 of the new cache 400 is populated. Note that step 514 can take some time to perform, but that the old cache is always accessible during this step.

In the header 402 of the old cache, a reference to the new cache 400 is written in step 516, and a flag is set marking the old cache "obsolete" in step 518. The new cache 400 is now ready for use. A cache search routine 114 on seeing the obsolete flag in the old cache follows the reference to the new cache 400 (see steps 302 and 304 of FIG. 3a).

The cache service routine 124, in step 520, requests that the operating system automatically delete the obsolete cache as soon as there are no applications referring to it, that is, as soon as all of the applications have release their references to the obsolete cache.

Regardless of whether a new cache 400 was just created, the data of interest are added to the current cache 400 in step 522. Step 522 of FIGS. 5b through 5d mirrors the complications of step 306 of FIGS. 3a through 3c because step 522 creates the data structures searched in step 306. While the specifics given in the Figures for steps 306 and 522 are illustrative of only some embodiments, in most embodiments, these steps mirror each other.

Figure 5C:
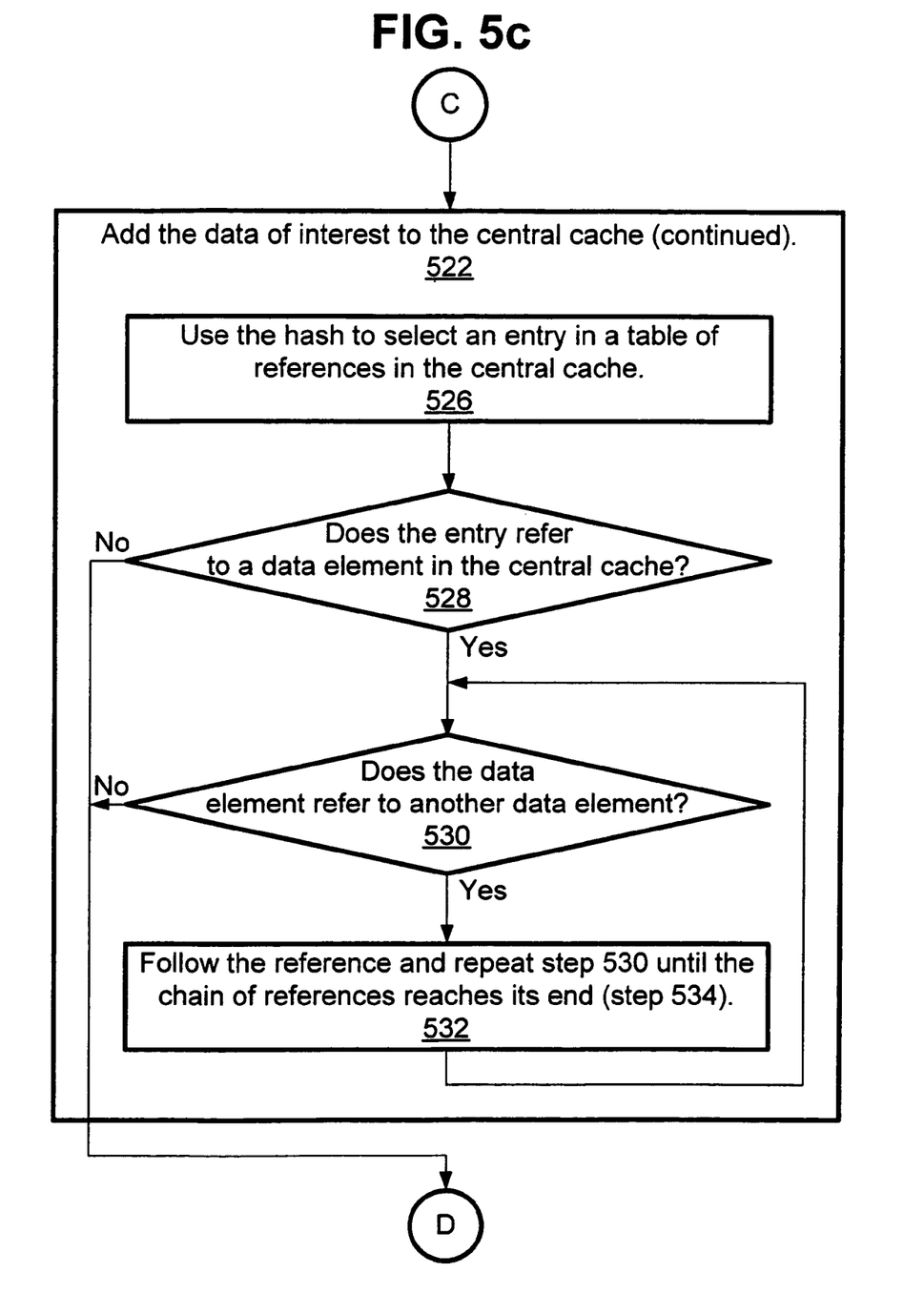
Figure 5D:
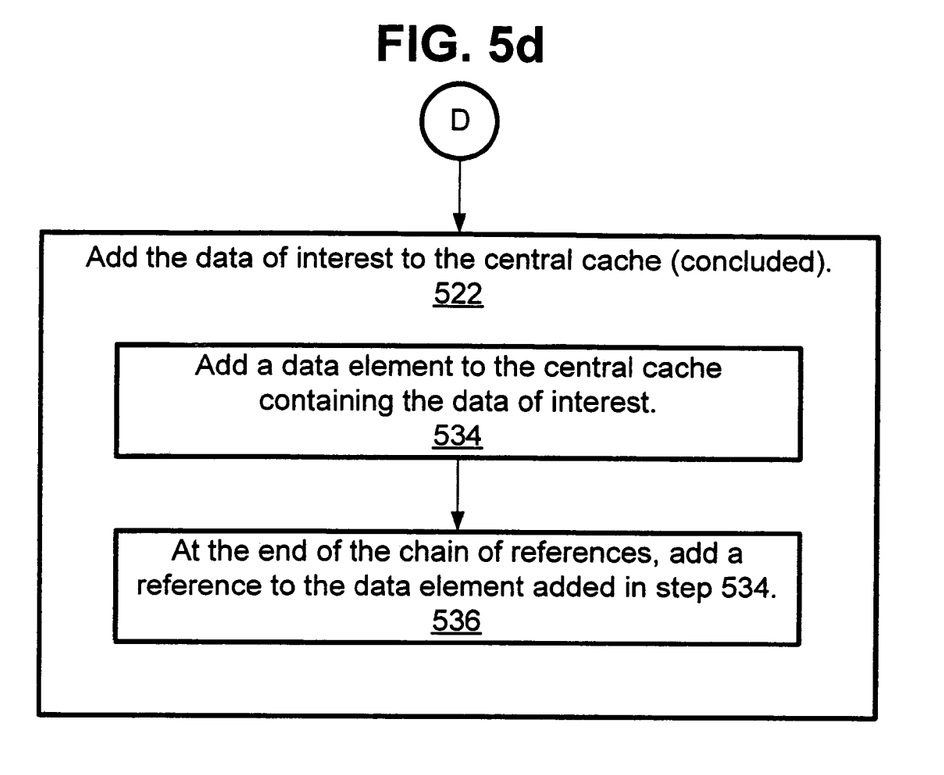

The specific embodiment of step 522 begins with hashing the data of interest in step 524 (mirroring step 308 of FIG. 3a). In step 526, the hash is used to select an entry in the table of references 404 of the cache 400 (mirroring step 310). If in step 528 the selected entry does not already refer to a data element 410, then in step 534 of FIG. 5d a data element 410 is created in the data storage area 406 of the cache 400. This new data element is then populated with the data of interest. Note that while this population step proceeds, a cache search routine 114 accessing the cache 400 will not see the new data, and therefore may make additional requests to add these same data. Once the population step 534 is complete and the new data element 410 is ready, the cache service routine 124 atomically updates the selected pointer in the table of references 404 to point to the new data element 410 (step 536). The writing of this reference takes up only one computer instruction so that it is inherently non-interruptible. Thus, the cache 400 need not be locked during this operation in order to retain its internal consistency.

Returning to step 528, if the selected entry in the table of references 404 already refers to a data element 410, then the reference field 412 of the data element 410 is examined in step 530. In step 532, the chain of references is followed until it ends. (This mirrors the search down the same chain of references in steps 316 through 324 of FIGS. 3b and 3c.) Once the end of the chain is found, the cache service routine proceeds to step 534, described above, where a new data element 410 is allocated and filled with the data of interest. In this situation, step 536 atomically adds a reference to the new data element 410 into the existing data element 410 that used to be at the end of the chain, thus extending the chain of references by one more "link."

To sum up, whether adding a new data element 410 to an existing central cache 400, or creating a new central cache 400, the cache service routine 124 proceeds in two phases. First, the data are prepared, and all of the time-consuming work is done. During this phase, the changes to the central cache 400 are not visible to cache search routines 114. There is, therefore, no need to lock the central cache 400 to preserve its internal consistency. Also, there is no need for the cache service routine 124 to run at a high priority. Phase two consists of writing a single pointer to the new data element 410 or to the new central cache 400. Writing a single pointer is an inherently non-interruptible procedure so, again, there is no need to lock the central cache 400 during this phase. Once the second phase is complete, the new data or the new cache are accessible to cache search routines 114.

Figure 6:
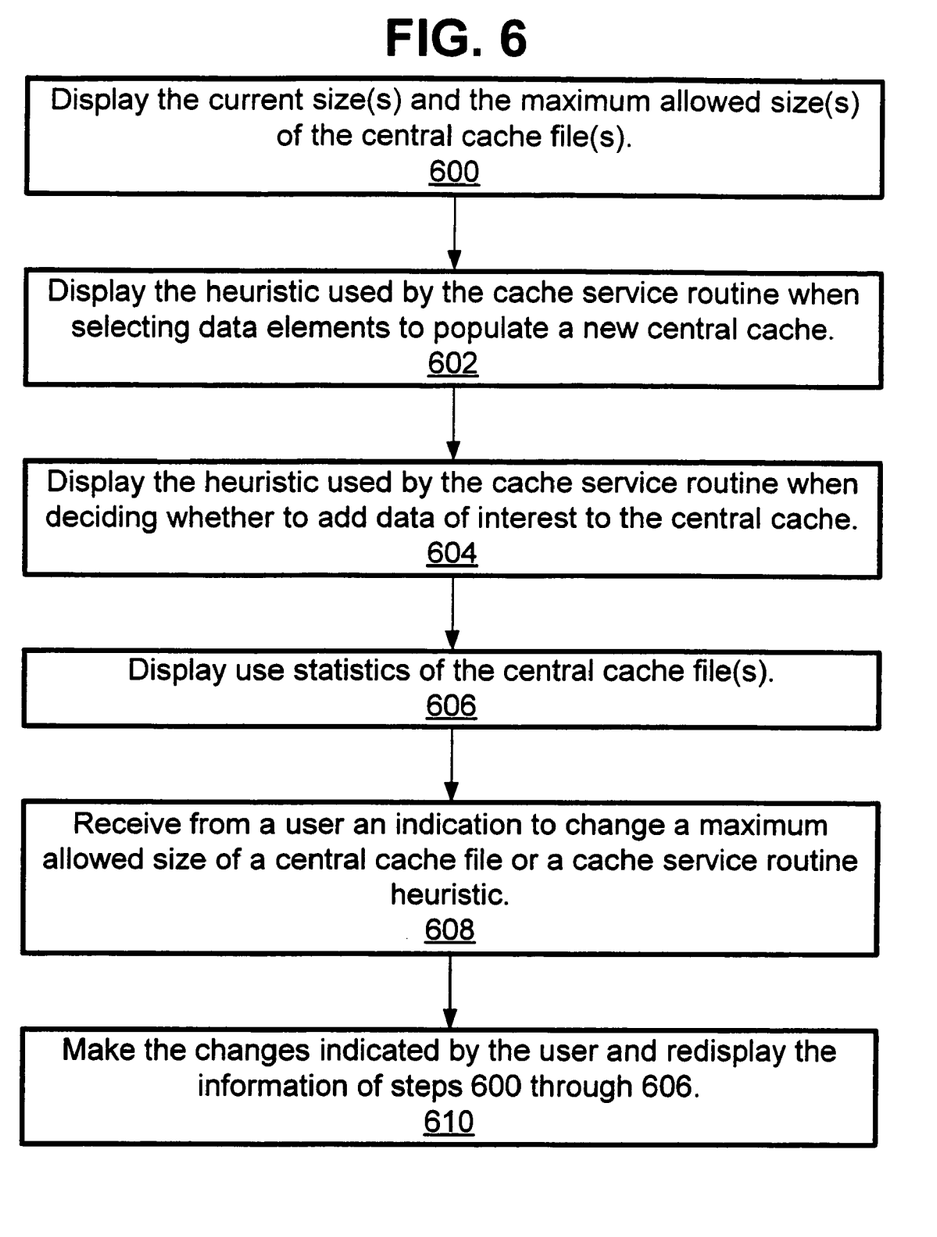
FIG. 6 is a flowchart of an exemplary method for configuring a central cache service routine.

FIG. 6 shows a method for monitoring and configuring the operation of the cache service routine 124. In step 600, the maximum and current sizes of the central cache are displayed. The heuristic used in step 514 of FIG. 5b to select data elements from an existing central cache when populating a new central cache is displayed in step 602. The heuristic used in step 504 to decide whether to comply with a request to add data to the central cache is displayed in step 604. Remember that this heuristic could simply be "always comply." Step 606 displays various statistics that have been gathered on cache usage. An administrator could analyze these statistics and decide that the central cache is not operating optimally. The administrator enters some change in step 608 which is reflected back in step 610. FIG. 6 is meant to merely give the flavor of a user interface and cannot do justice to the wide variety of cache analysis tools well known in the art.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments, especially the data structures and procedures based on them, can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. A method for a user of a computing device to alter parameters of a cache service routine, the method comprising:

displaying a heuristic to be used by the cache service routine when the cache service routine populates a new central cache with data elements selected from an existing central cache, the selection based, at least in part, on the heuristic;

receiving from the user an indication of a new heuristic;
displaying the new heuristic; and
making the new heuristic accessible to the cache service routine.

2. The method of claim 1 wherein the new heuristic is selected from the group consisting of: most recently used, most often used, and round robin.

3. The method of claim 1 further comprising:
displaying a current size of the existing central cache;
displaying a maximum allowed size of the existing central cache;
receiving from the user an indication of a new maximum allowed size;
displaying the new maximum allowed size; and
making the new maximum allowed size accessible to the cache service routine.

4. The method of claim 1 further comprising:
displaying use statistics of the existing central cache.

5. A computer-readable medium containing instructions for performing a method for a user of a computing device to alter parameters of a cache service routine, the method comprising:
displaying a heuristic to be used by the cache service routine when the cache service routine populates a new central cache with data elements selected from an existing central cache, the selection based, at least in part, on the heuristic;
receiving from the user an indication of a new heuristic;
displaying the new heuristic; and
making the new heuristic accessible to the cache service routine.

* * * * *